April 23, 1929.  H. M. SUTTON ET AL  1,710,521
PROCESS AND APPARATUS FOR THE SEPARATION OF DRY MATERIALS
Filed Jan. 19, 1922    10 Sheets-Sheet 4
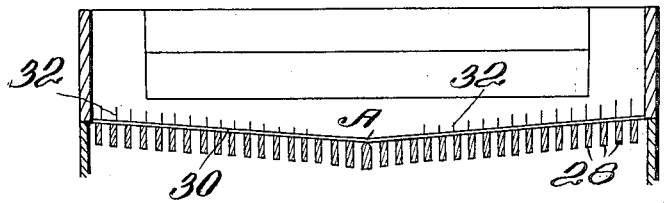
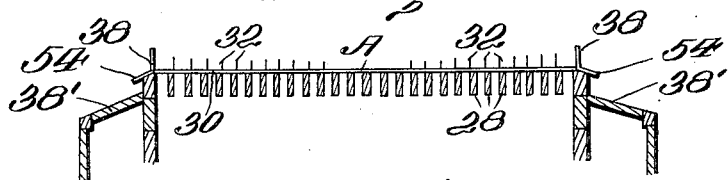
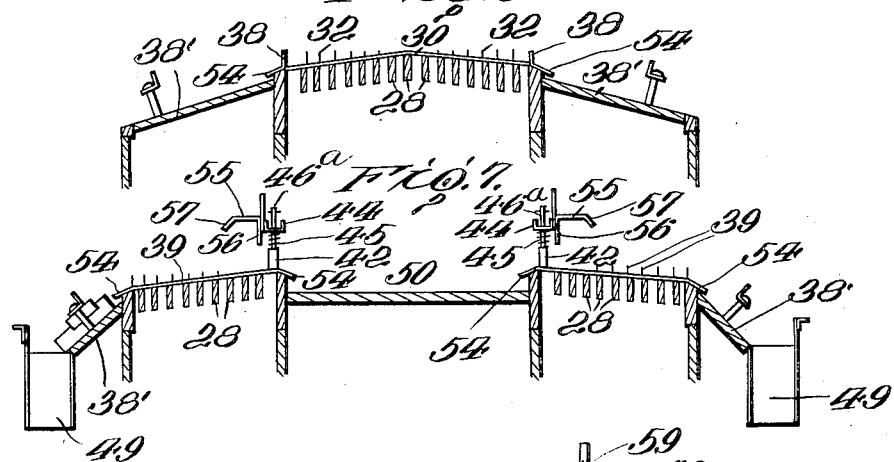
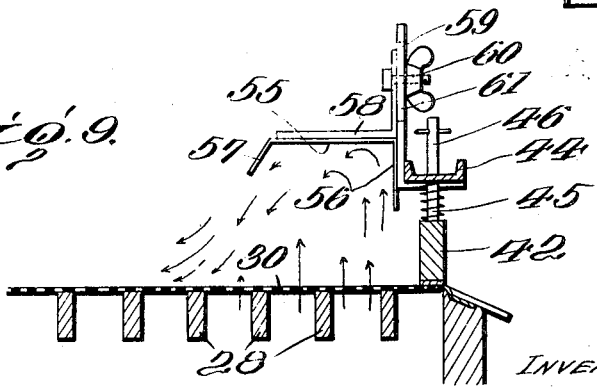
INVENTORS
H. M. Sutton
W. L. Steele
E. G. Steele
BY A. S. Pattison ATTORNEY

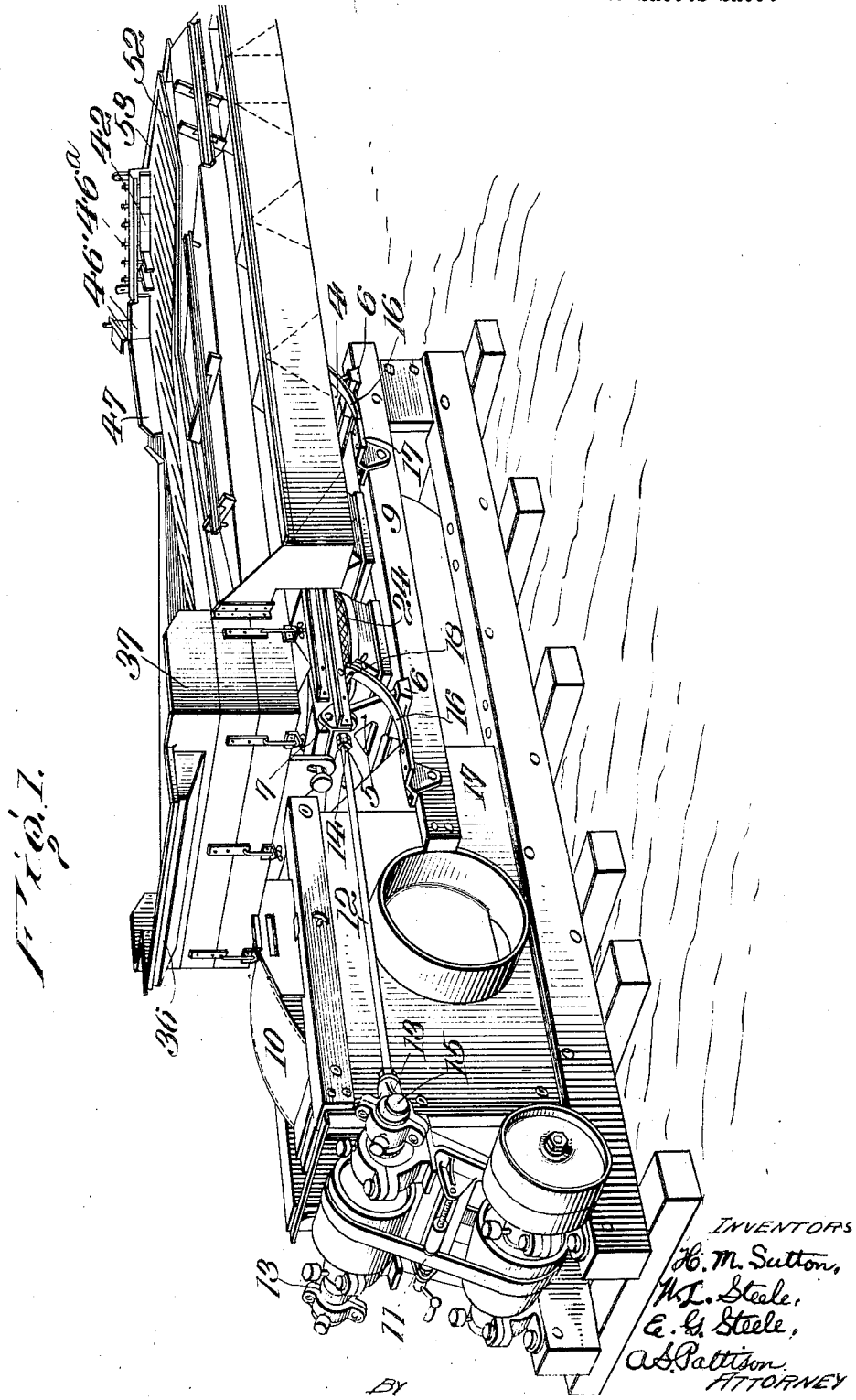

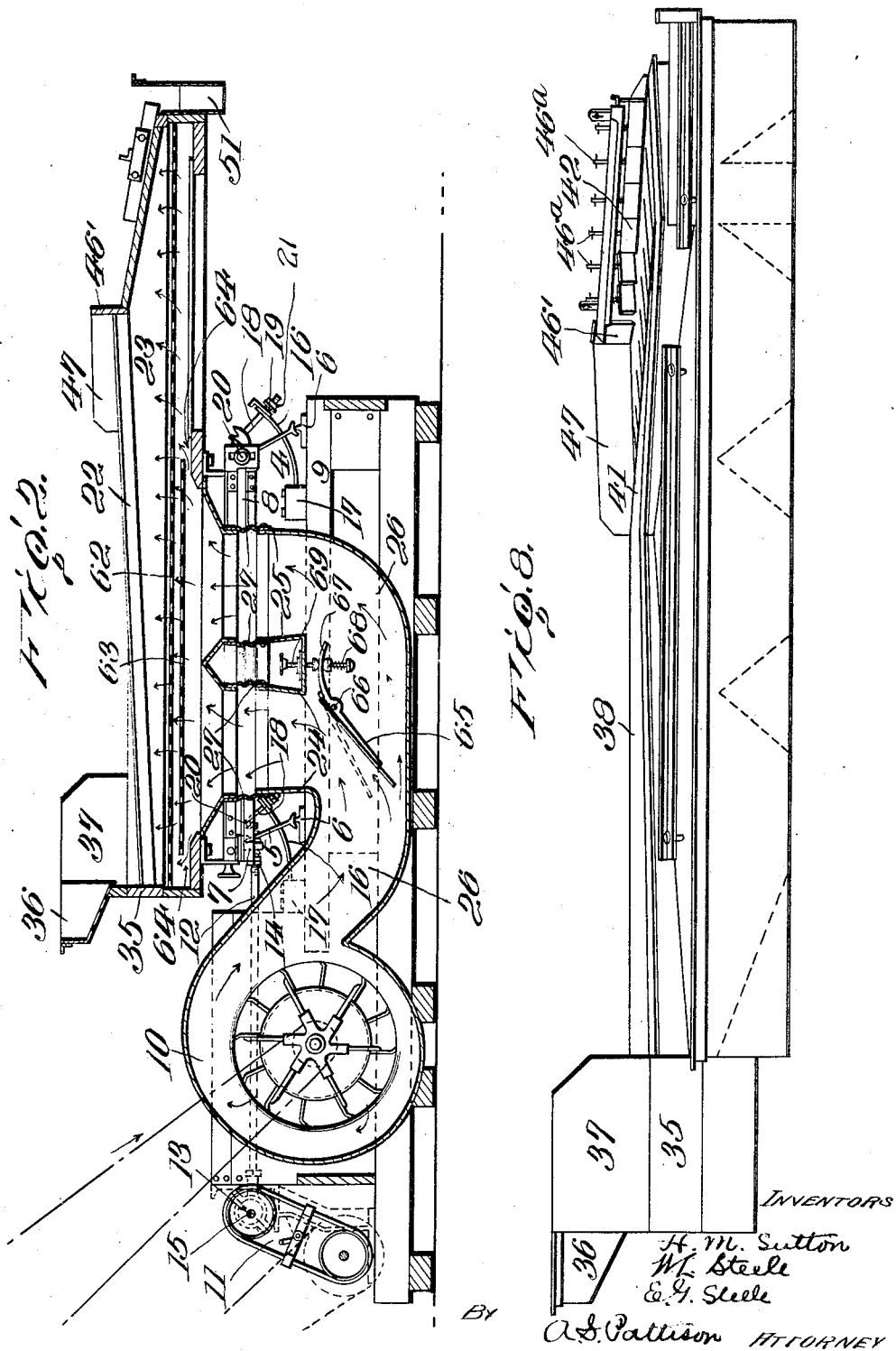

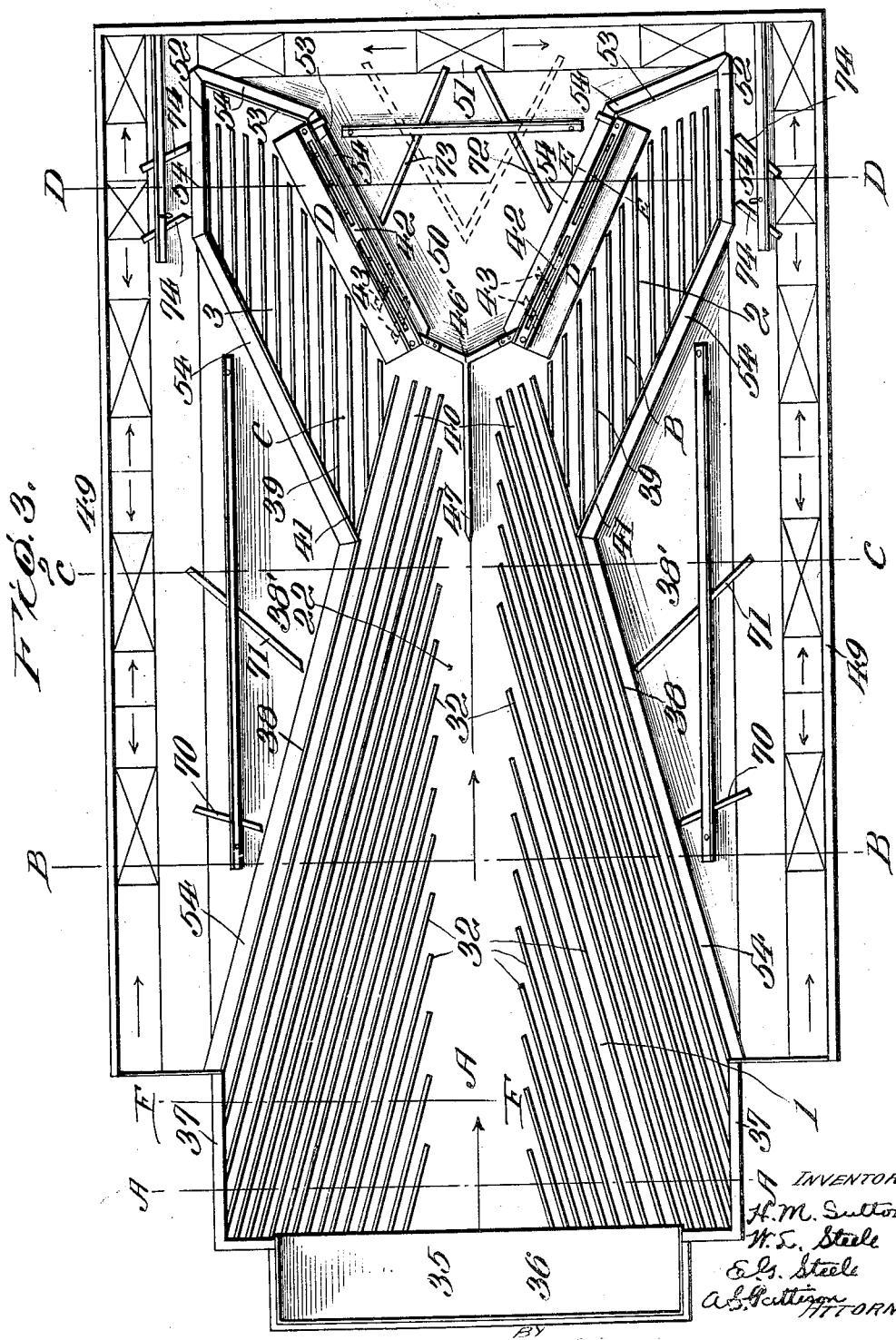

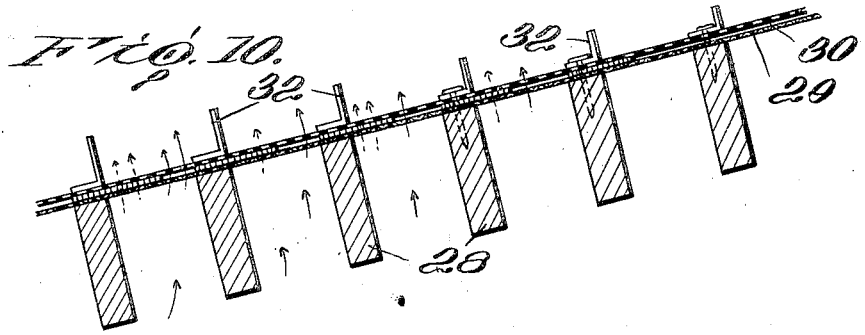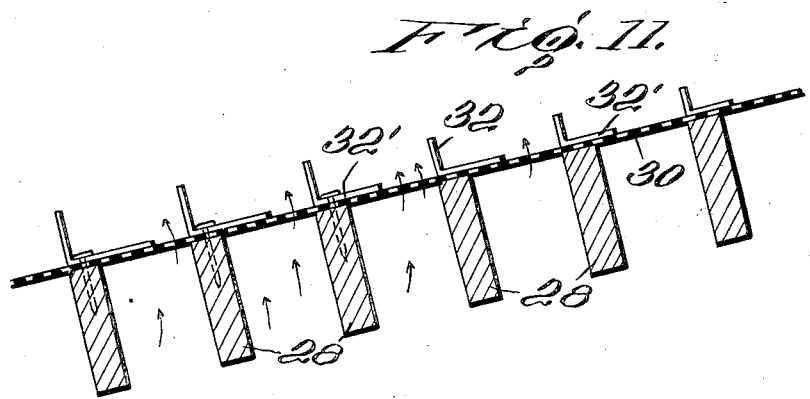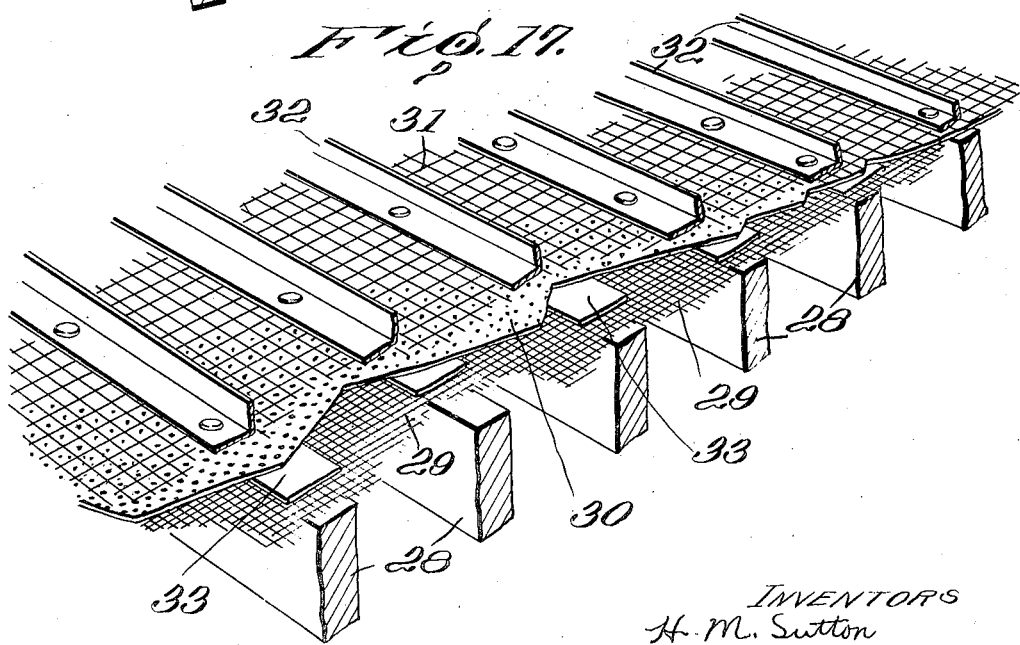

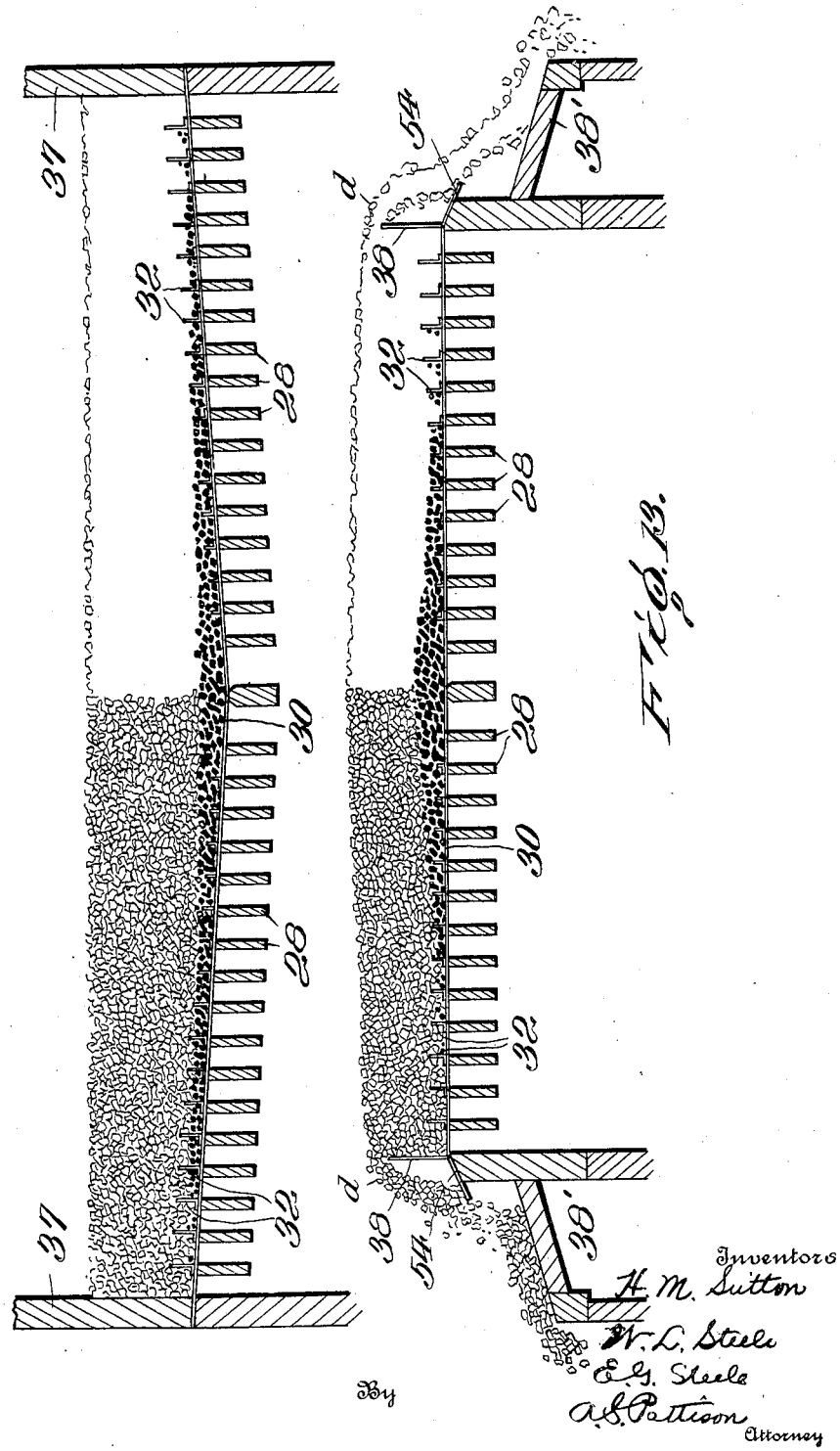

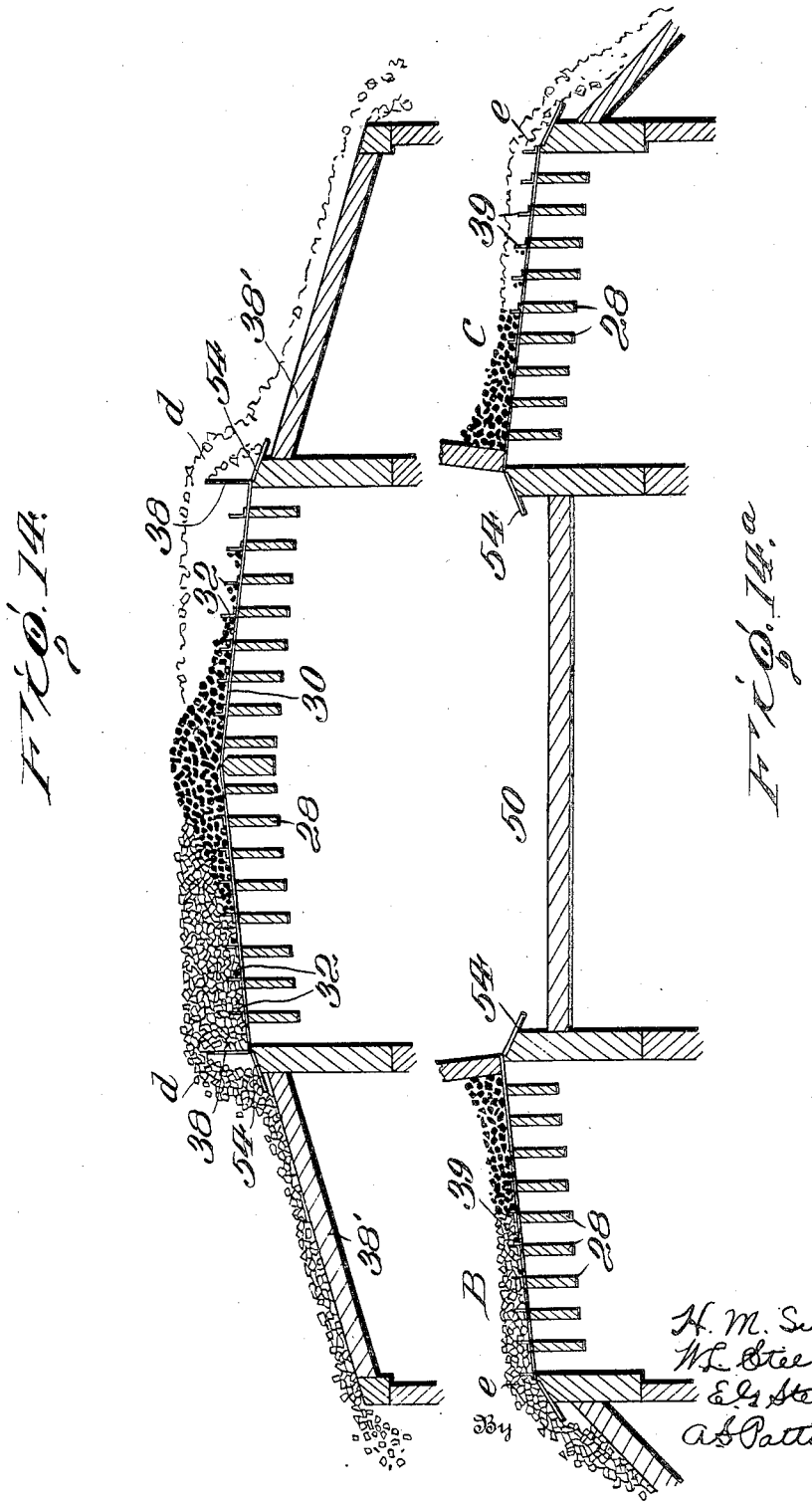

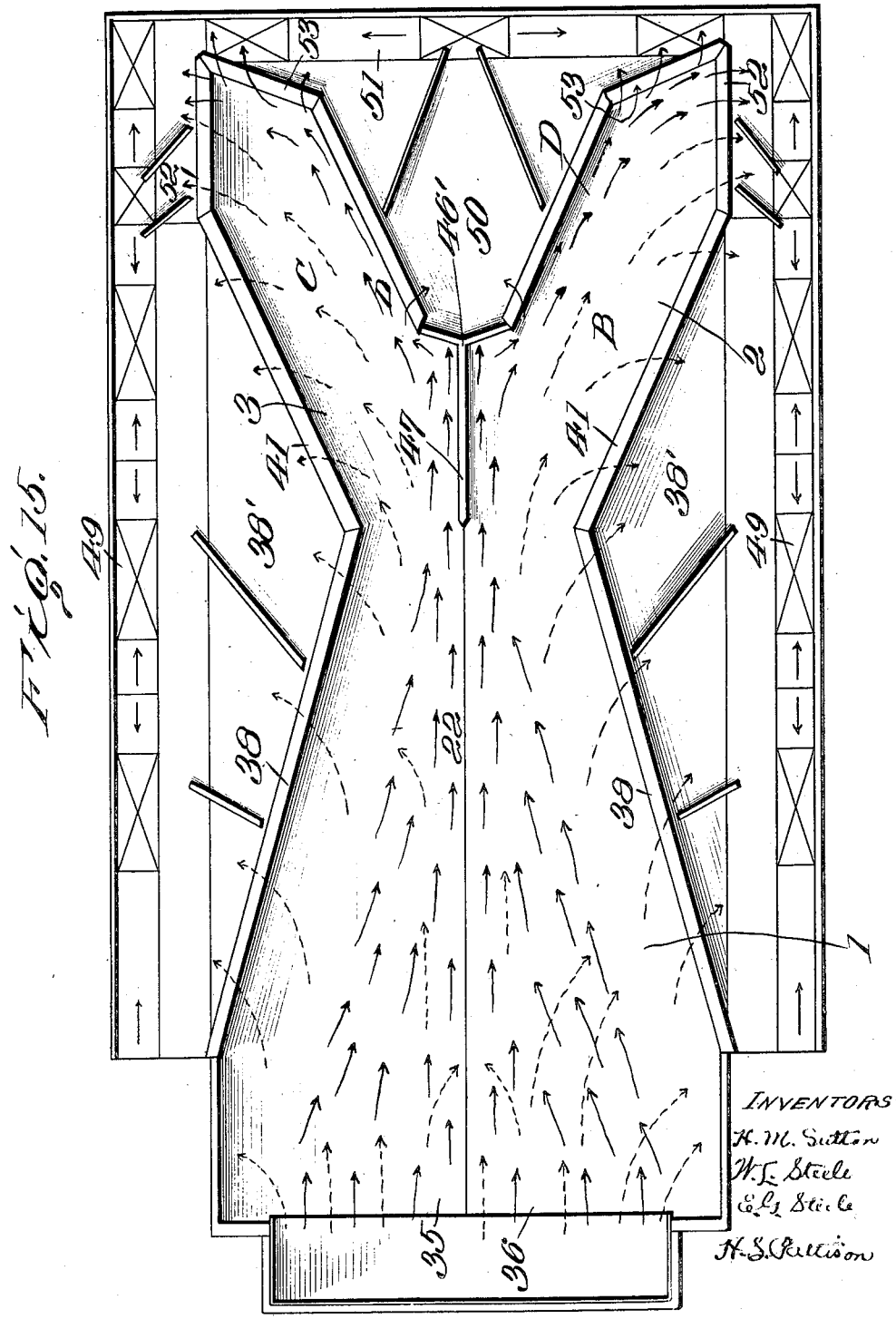

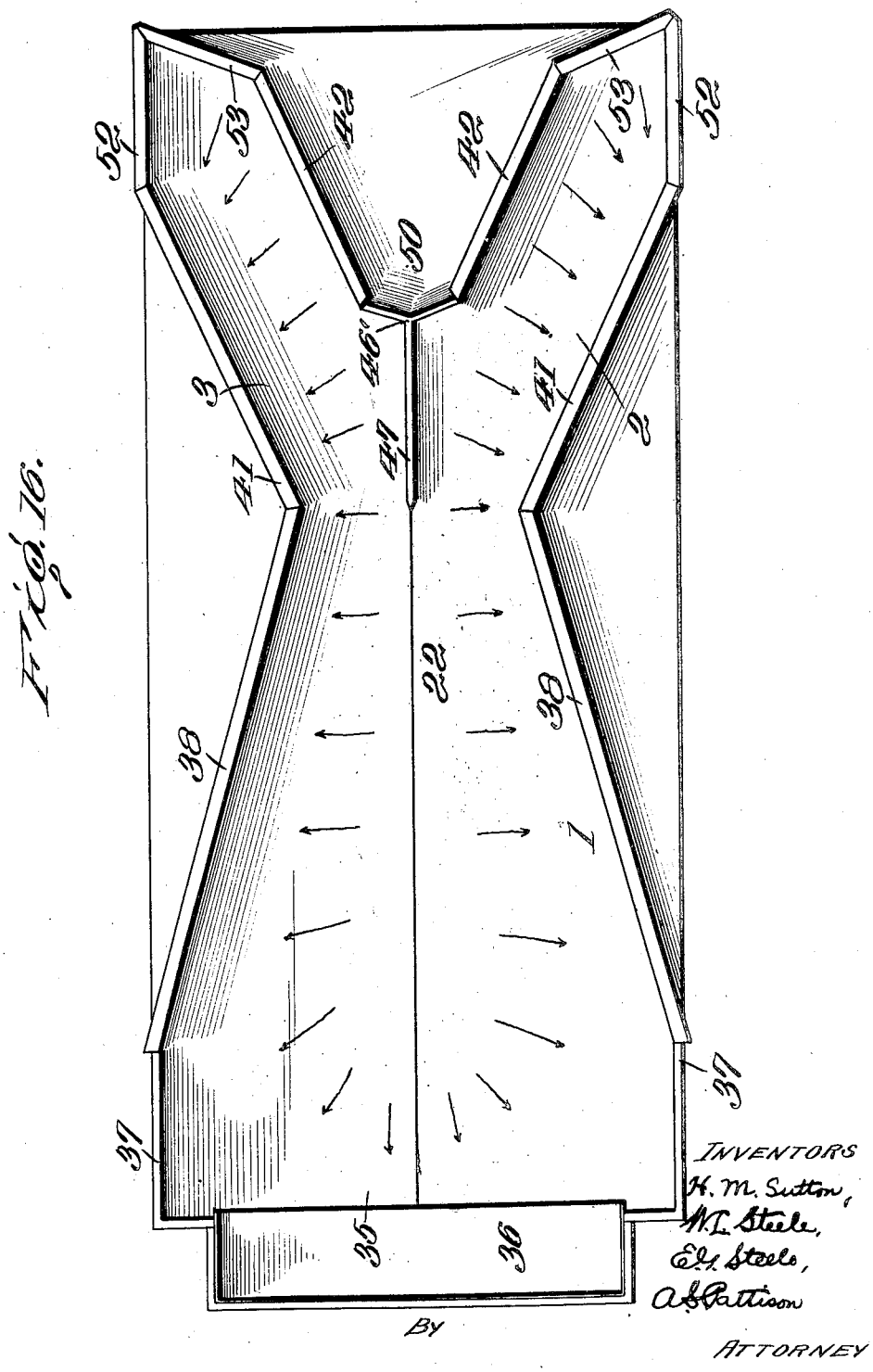

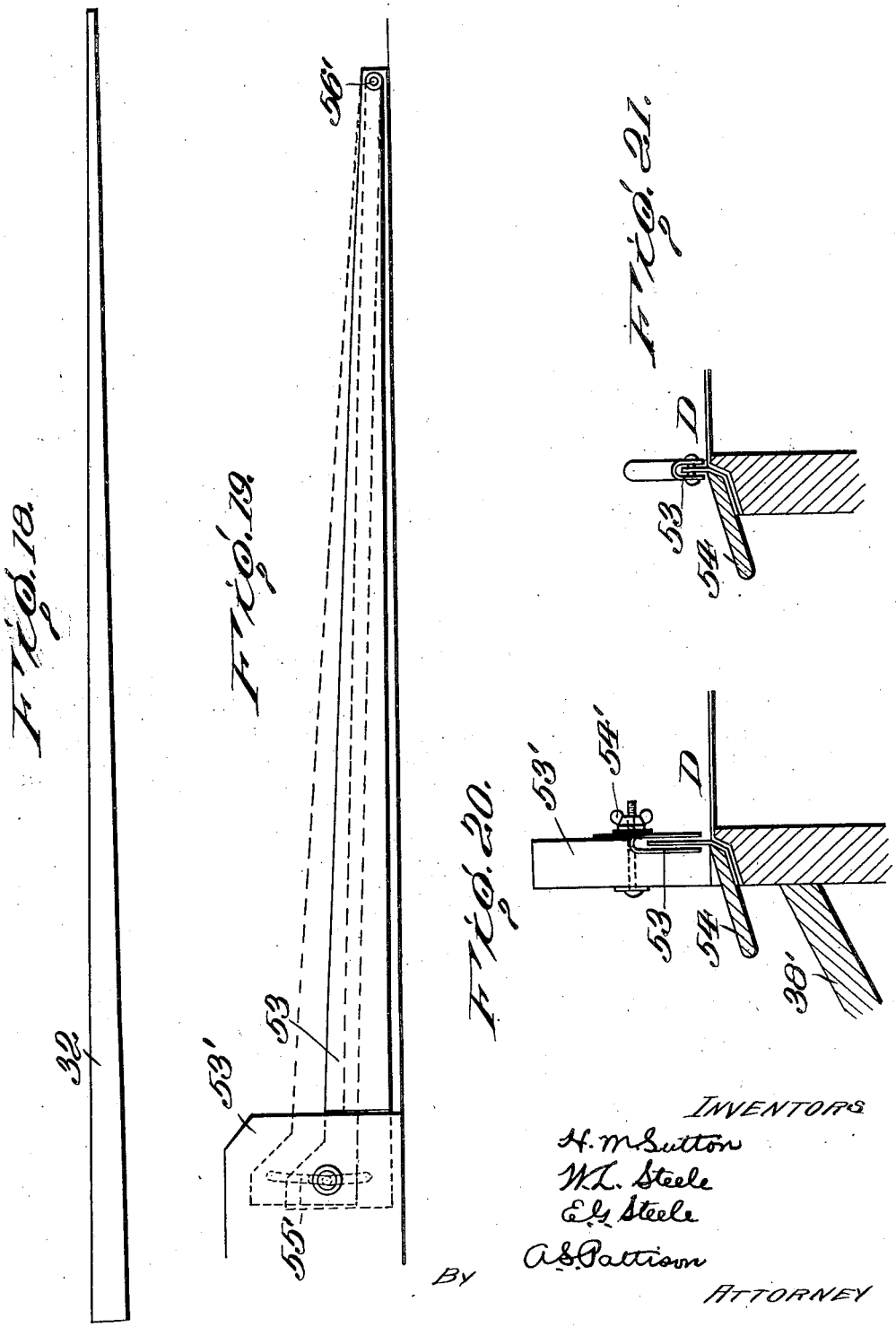

Patented Apr. 23, 1929.

1,710,521

UNITED STATES PATENT OFFICE.

HENRY MOORE SUTTON, WALTER LIVINGSTON STEELE, AND EDWIN GOODWIN STEELE, OF DALLAS, TEXAS.

PROCESS AND APPARATUS FOR THE SEPARATION OF DRY MATERIALS.

Application filed January 19, 1922. Serial No. 530,357.

This invention relates to improvements in a process and apparatus for the separation of dry materials, and is particularly intended for cleaning coal from its deleterious materials, such as slate, sulphur and bone, but can also be used for the separation of the different elements of ores, such as iron-ores, zinc and lead ores, etc., and can also be used for the cleaning and grading of various kinds of agricultural products, such as peanuts, beans, peas, seeds and cereals, and other materials composed of elements having different specific gravities.

The object of our improved process and improved apparatus is to quickly and efficiently handle and clean or separate large quantities or masses of materials containing elements having different specific gravities, such, for instance, as coal, etc., and thereby greatly increase the speed and capacity of the separation or cleaning as compared with all prior methods known to us.

The fundamental principle of our process may be stated in general to be first effecting a concentration of the heavier particles into a stream which is moving in the line of travel of the mass; simultaneously effecting a final delivery of a portion of the lighter particles at a point to one side of and at an angle to the direction of the travel of the stream of heavier particles, the elements composing the stream being directed outward at an angle, and separating the lighter elements from the heavier of the said stream by causing a banking zone of the heavier particles beyond the lighter ones, and separately collecting each as finished products.

Our improved process also involves providing a sufficient amount of heavier elements to constitute a moving stream thereof and then forming the stream of heavier particles into a banking zone at a point beyond the relatively lighter elements, thus causing a final separation of the lighter and heavier elements and separately collecting them as finished products.

Our improved process further involves the feeding of a mixture in one stream, separating and delivering as finished products the lighter elements into two divergingly moving sheets, and simultaneously forming the remaining heavier elements into one stream, dividing the remaining stream into two divergingly moving streams, and finally separating the lighter elements from the heavier elements of these two latter divergent streams by effecting a banking zone of the heavier elements in each of the said streams, so as to form two separate zones of heavier elements beyond that of the lighter ones, and separately collecting each as a finished product.

Our improved process also involves the feeding of a mass of materials and simultaneously laterally delivering the lighter particles of the mass, and simultaneously collecting the relatively heavier particles into a moving stream, and then restricting the flow of the remaining mass of the materials, and subsequently separating the lighter from the heavier particles of the mass.

Our improved process also involves the feeding of a mass of materials, collecting the heavier particles into a moving stream and simultaneously therewith delivering the lighter particles, restricting the flow of the remaining mass, and subsequently dividing the restricted mass into divergent flowing streams, and finally separating the lighter particles from the heavier particles of each of the said divergent flowing streams.

Our improved process also involves the feeding of a mass of materials, forming the relatively heavier particles into a central moving stream, and simultaneously restricting the flow of the moving mass substantially throughout its area, thereby causing the lateral delivery of the lighter particles in the divergent flowing streams.

Our improved process also involves the feeding of a mass of materials, separating and forming the relatively heavier elements of the mass into a central flowing stream, and simultaneously restricting the flow of the whole mass of material substantially throughout its area to cause a lateral delivery of the lighter particles into divergent streams, then dividing the remaining restricted mass into two divergent flowing streams, and finally separately causing the separation of the lighter particles from the heavier particles of these two latter-mentioned divergent streams.

Our improved process further involves combining with the banking and cushioning steps of our process a downward and backward air current, which is caused to impinge on the surface of the advancing mass at a point back of the banking action, thereby repelling the lighter particles of the remaining mass and causing the lighter particles to be delivered or to report at a point in the rear of the middlings delivery.

Our new Y-shaped concentrating and separating table preferably has its feeding end thereof with its floor depressed at its center and the sides inclined upwardly and outwardly, this depressed portion with inclined walls gradually merging into the portion which is transversely flat or substantially flat, and this flat portion of the floor gradually merging into a relatively elevated central portion with declined sides (the reverse of the shape of the floor at the feed end) and this elevated portion merging into two divergently arranged separating units.

Our improved apparatus, as herein illustrated, consists of a Y-shaped concentrating and separating table, the stem of the Y being constricted to form its feeding end substantially to its junction with the arms of the Y, which is adapted to carry out our improved process.

Our improved apparatus also embodies several additional features for accomplishing specific purposes, all of which will be particularly pointed out hereinafter.

Referring now to the drawings:—

Figure 1 is a perspective view of our improved apparatus, which is one mechanical expression for carrying out our new process.

Fig. 2 is a longitudinal vertical central sectional view through Fig. 1.

Fig. 3 is a top plan view of our apparatus with the fan housing and operating mechanism omitted.

Fig. 4 is a cross vertical sectional view through the table deck on the line A—A of Fig. 3, looking in the direction of the feed end of the table, the lower portion of the table broken away.

Fig. 5 is a vertical cross-sectional view through the table on the line B—B of Fig. 3, looking in the direction of the feed end of the table, with that portion of the table below the skirt boards omitted.

Fig. 6 is a vertical cross-sectional view through the table deck of Fig. 3, on the line C—C, looking in the direction of the feed end of the table; the lower portion of the table and its adjuncts being omitted.

Fig. 7 is a vertical cross-sectional view through the units decks of the table, on the line D—D of Fig. 3, looking in the direction of the feed end of the table, the lower portion of the table being broken away.

Fig. 8 is a detached side elevation of the concentrating and separating deck and its air-chest.

Fig. 9 is a cross-sectional view on the line E—E, Fig. 3.

Fig. 10 is a vertical cross-sectional view through the deck surface on the line F—F of Fig. 3, looking in the direction of the feed end of the deck.

Fig. 11 is a view similar to Fig. 10, showing a modification of the deck air obstructing strips.

Figures 12, 13, 14 and 14ª are diagrammatic vertical cross sectional views through the deck on the respective lines A, B, C, D of Figure 3.

Fig. 15 is a diagrammatic plan view of the apparatus shown in Fig. 3, with the riffles of the deck not shown, the heavy arrows showing the direction of flow of the relatively heavy particles of the mass, and the dotted arrows showing the direction of the flow of the relatively lighter particles.

Fig. 16 is a top plan diagrammatic view of the concentrating and separating deck, the arrows pointing in the direction of the decreasing air pressure through the pervious deck and away from the area of the highest air pressure.

Fig. 17 is a detached fragmental perspective view of our preferred form of concentrating and separating deck surface.

Figure 18 is an enlarged longitudinal view of the riffles 32.

Figure 19 is an enlarged longitudinal view of the adjustable banking riffle 53.

Figures 20 and 21 are cross sectional views of Figure 19.

The apparatus herein shown is our preferred mechanical expression of our new table, and it is the preferred form of apparatus for practicing and carrying out our new method. As shown, our new table is approximately Y-shaped in plan view, the stem portion 1 of the Y is what may be termed the main portion of the table and the two arms 2 and 3 of the Y is where the final separation takes place.

This Y-shaped table may be supported in any suitable manner to effect a differential reciprocation. In the form here shown, for effecting the differential reciprocation, the table is mounted upon normally inclined toggle plates 4 and 5, which have their lower ends seated on base-plates 6, and their upper ends resting in the angle of the castings 7, attached to the under side of the frame 8. These toggle plates extend transversely of the table and are made of suitable length to provide a substantial and durable rocking support for the table. The plates are supported on a base-frame 9, which extends beyond the rear end of the table and carries a suitable fan-housing 10, and in the rear of the fan-housing is a driving mechanism 11, which is connected by means of pitmen 12 and eccentric 13 to the table-frame in any suitable manner at the points 14, there being two pitmen, one on each side of the fan-housing 10 and the forward ends of these pitmen connected to opposite rear corners of the table-frame 8.

The driving mechanism 11 is preferably of a well-known speed change construction, whereby the speed of the driving shaft 15, which carries the eccentrics 13, may be varied and in that way the speed or reciprocation of the table may be controlled as desired.

For the purpose of holding the toggle-plates 4 and 5 in their seats and preventing them from being unseated by the reciprocation of the table, we provide at each end of the table frame 8 a suitable number of forwardly and upwardly extending springs 16, which have their lower ends connected to the base-frame 9, at points 17 and a suitable number of bolts 18 have their lower ends passing loosely through an opening in the spring 16 and carrying projections 19, which rock on the lower sides of the springs, and the upper ends of these bolts 18 have a rocking connection with the frame 8 at the points 20. By this arrangement there is no bending strain on the bolts 18 and fracture by crystallization of the metal of the bolts is avoided. By this arrangement the springs 16 hold the table in its normal balanced position, shown in Fig. 2, whereby the eccentrics are relieved from the weight of the table.

Furthermore, this construction in operation raises the table in a diagonal line on the forward stroke, falling back on the return stroke, whereby a differential reciprocating motion is imparted to the table. That is to say, the table is lifted in its forward motion and drops in its rearward motion. The rocking projections 19 on the bolts 18 are adjustable by means of nuts 21, carried on the bolts 18, whereby the tension of the springs can be regulated to effect the desired balance of the table.

The table 1 comprises a concentrating and separating deck 22 and an air chamber 23 below the deck 22 which extends down and is in communication with two pipes 24 and 25, the lower ends of which are in communication with a conduit 26, which in turn is in communication with the fan-housing 10. The upper ends of these pipes 24 and 25 are flexibly connected at the points 27 with the downward extension of the air-chamber, whereby the table is permitted the above described reciprocating movement independent of the stationary pipes 24 and 25.

The concentrating and supporting table 22 is constructed with a pervious floor, whereby there is a flow of air through this floor. The preferred construction of the floor of the concentrating and separating deck is clearly shown in Fig. 17. There is provided a suitable number of supporting ribs 28. Placed on top of these supporting ribs 28 is a coarse-wire netting 29, and on top of this is located the pervious table floor 30. Located on top of this pervious floor is preferably a second layer of relatively very coarse mesh wire-netting 31, and on top of this are the riffles 32. Located between the pervious floor 30 and the coarse wire netting 29 are pervious air-controlling strips 33, and these strips are located in a vertical line between the riffles 32 and the supporting ribs 28. It will be observed that the riffles 32, the air-controlling strip 33, and the supporting ribs 28 which are located at one side of the center of the stem of the Y, all extend inward at an angle towards the arms of the Y, whereby there is provided a plurality of the said elements at each side of the center of the stem of the Y, and all extending at an angle inward and forward towards the arms of the Y. It will be observed by reference to Fig. 3, that the riffles do not extend to the center of the table, thus providing an unobstructed central portion A of the stem portion of the Y-table, for a purpose to be presently described.

All of the riffles 32 gradually increase in height from their forward to their rear ends. In practice when working on coarse materials the forward end of each of the riffles is approximately an eighth of an inch high and gradually increasing in height towards its rear end, and the air-controlling strips correspondingly vary in width, that is to say, the controlling strips have their narrow ends at the narrow ends of the riffles and gradually widen to their rear ends, corresponding, as just stated, to the gradual variation of the height of the riffles. By reason of this construction, it will be understood that the shorter riffles at the rear end of the stem of the Y of the table, have the height of their front ends approximately the same height of the long riffles, and as the taper of the short riffles is on the same scale as the increase of the long riffles, the extreme height of the rear ends of the short riffles is much less than the extreme height of the long riffles, as shown in cross-section, Fig. 4.

The butt end 35 of the stem of the Y-table is the feed end of the table, and there is a transversely elongated feed-pan 36 for feeding the material by which the material to be acted upon is fed to the table in a wide sheet, utilizing any of the well-known mechanical feeding devices. By reference to Fig. 8, it will be observed that the butt end 35 of the stem of the Y of the table has upwardly extending marginal sides 37 for a short distance, as clearly shown in Figs. 3 and 8. In the specific mechanical embodiment of our table here shown, the stem 1 of the Y gradually lessens in width to the junction of the stem of the Y with its arms 2 and 3, thereby providing a gradual transversely constricting of the stem of the Y portion of the deck to its junction with the arms of the Y, the function and operation of which will be described hereinafter. The opposite sides or edges of this tapering or constricting portion of the deck is provided with upwardly projecting tailing riffles 38. These tailing riffles 38, like the deck riffles 32, gradually increase in height from their front to their rear ends, the function of which will be stated hereinafter. For a purpose to be described hereinafter, these tailing riffles 38 will be made detachable so that riffles of different heights can be provided, thus affording a vertical adjustment for these riffles, but, of course, the vertical adjustment can be accomplished in other ways.

The arms 2 and 3 of the Y meet the stem of the Y at its point of greatest constriction and the arms diverge outward like the arms of the Y and form the table into two divergent concentrating and separating channels or members B and C, upon which the final separation is made. These divergent channels or members each have a plurality of parallel riffles 39, which extend from the rear sides of the channels toward the front sides, but are shorter than the width of the channels to leave their inner sides unobstructed to form a divergent extending concentrating pathway D for the heavier elements of the material, to be more specifically described later on. The separating and concentrating floors of these channels or arms 2 and 3 are constructed exactly the same as the floor of the stem portion of the Y, as shown in Fig. 17, and, likewise, the riffles 39, the air-retarding strips and the supporting ribs are also the same construction and the same arrangement as in the stem of the Y, as shown in Fig. 17, except that the riffles, the retarding strips and supporting ribs extend in a direct line with the thrust or reciprocation of the table, instead of at an angle thereto as in the stem of the Y. Attention is also directed to the fact that several of the riffles 32 of the stem of the Y, adjacent to the arms of the Y, extend through the restricted portion of the table and approximately across the receiving ends of the channels or arms 39, as clearly shown at 40, the purpose of which is to supply a feed across the area of the receiving ends of the channels or arms 39, of the unseparated material moving on the stem table. The outer edges of these channels 39 are provided with upwardly extending tailing riffles 41, which have their inner ends at the forward ends of the tailing riffles 38 of the stem of the Y and gradually diminishing in height, from their inner to their outer ends. From this it will be understood that the highest part of the tailing riffles 41 is substantially the same as the lowest height of the tailing riffles 38.

Located at the inner edges of the arms or channels 39, are concentrating members 42, and these concentrating members are made up of a plurality of sections 43, which are laterally movable whereby this concentrating member may be continuous, or broken for the purpose of forming passageways for releasing or delivering certain products from the concentrates laying against the concentration member. In the form here shown, a channel bar 44 is located above the concentrating member 42, and the concentrating member does not extend up to the channel bars, and springs 45 are located around the pivots 46ᵃ of the sections of the concentrating member and between it and the channel bar for holding the sections of the concentrating member down on the floor of the deck and at the same time permitting their lateral movement for the purpose stated.

The inner ends of this concentrating member 42 are in separated relation, but are joined together by an angle wall 46′, and a vertical dividing wall 47 extends inward from the apex of the angle-wall 46 to a point substantially or approximately at the greatest restriction of the stem of the Y of the table, the function of which will be described hereinafter.

The opposite sides of the table are provided with outwardly and downwardly inclined skirt-boards 38′, from which project two suitable receiving chutes or launders 49. There is also an outwardly declining skirtboard 50, located between the inner edges of the arms of the Y of the table and this also extends to suitable launders 51.

Referring now to the floor of the deck of the stem of the Y table, its feed end is lowest in the center and inclines outwardly and upwardly, as shown in cross-section, Fig. 4, and gradually merges from the point A, Fig. 3, to the point B—B of the same figure, at which point the deck is level in transverse section, as shown in Fig. 5. From B—B, the deck gradually merges in a forward direction to the points C—C of Fig. 3, at which point it merges into an elevated central portion with declining sides, as shown in Fig. 6, and the deck then maintains this shape across the receiving ends of the channels or arms 39, and to the inner side of the angle wall 46.

Attention is called to the fact that the outer ends of the arms or channels 39 come to a point and that the tailing riffle 41, extends around one side of this point, as shown at 52, and that the other side of the point is provided with a banking riffle 53 and that the inner ends of the banking riffle and the tailing riffle are highest and they gradually lessen in height to their outer ends. There is a skirt-iron 54, which extends all around the table, including the inner sides of the concentrating members 42, around the sides of the points and also the outer sides of the channels 39, and around the narrow or restricted portion of the stem of the Y of the table.

In Fig. 9 we show an enlarged detail sectional view of the concentrating member and its combined air-blowing baffle for directing a current of air downward and backward on the surface of the mass for the purpose of pneumatically repelling the lighter floating elements of the mass at a point back of the concentrating member. This air-blowing baffle consists of a rearwardly extending baffle or flange 55, which is located a suitable distance above the concentrating member 42, and extends throughout the length of said member. This baffle 55 has its rear edge provided with a downwardly extending flange 56, primarily for bracing and strengthening it and its forward end is inclined downwardly and rearwardly as at 57. A suitable number of supporting L-shaped bars 58 are secured to the upper surface of this baffle plate, the upwardly extending arm of the L-shaped bars 58 resting against the supporting members 59, which are suitably attached to the angle bar 44, previously described. A wing-nut and bolt 60 pass through the supporting member 59 and the upper extending arm of the L-shaped bar 58 for holding the baffle plate in position, one of said members having a vertical slot 61, by means of which the baffle plate can be vertically adjusted for the purpose of controlling and directing the current of air according to the character of the material being treated. In this Fig. 9 we illustrate the direction of the air current which first flows through the pervious bottom 30 of the deck under pressure from the air-chamber 23, and is then caused to flow as indicated by arrows downward in a rearward direction and caused to impinge upon the lighter elements floating on the surface of the mass and repelling them in the manner just stated.

Returning now to the air-chamber of the table and the air-conveying pipes communicating therewith, attention is directed to the air-distributing pervious member 62, which is located in the chamber just below the pervious deck 32 and extends throughout the area of the chamber. A second air-distributing pervious member 63 is located below the just-mentioned air distributing member 62, and is so supported that air-passages 64 are formed at its ends through which air from the pipes 24 and 25 may pass. The porosity of these members 62 and 63 is much greater than the porosity of the pervious deck 22. By means of these air distributing members 62 and 63 the air-pressure is distributed evenly throughout the pervious deck 22. However, we provide means for varying the air pressure on opposite ends of the pervious deck, and this is accomplished by providing an adjustable damper 65. This damper is pivoted at the point 66 and has a laterally extending arm 67, which may be adjusted vertically by any suitable means, such, for instance, as a spring 68 having a constant upward pressure on the under side of the arm 67 and a vertically adjustable screw-threaded bolt 69, which bears upon the upper side of the arm 67. In this way the damper controls the amount of air flowing into the pipe 25, whereby it may be diminished or increased and at the same time diminishes or increases the same proportion of air flowing through the pipe 24. In this way we vary, when desired, the air pressure to the different parts of the pervious deck.

When working on certain classes of materials, we find it advantageous to use means for forming a dead air space to take the place of the above described pervious air-controlling strips 33. This method construction is shown in Fig. 11, and it consists in extending the base of the riffles 32, as shown at 32′ to cause a dead space extending parallel to the riffle 32, and this riffle base 32′ will taper the same as the air controlling strips 33, which we have already explained. We desire it to be understood that the air-controlling strips 33 may be imperforate to form a dead air space to work on certain kinds of materials instead of extending the base of the riffle 32, as just stated.

It will be observed from Figs. 12 and 13 that the riffles 32 serve as division walls in the separation for guiding the heavier and larger particles to the center of the table, and it of course will be understood from the description and disclosure that the table has a slower movement in the direction of the travel of heavier material than its return movement. In fact this movement is the essence of practically all of the prior patents of applicants which are known to the office.

It will also be understood from the description and disclosure particularly Fig. 11 that different quantities of air pass through the table at different parts thereof by reason of the short and long horizontal parts 32′ of the riffles as shown in Fig. 11. This construction permits a differential air feeding throughout the surface of the different parts of the table, and that the same is substantially provided in the tapering strips 33 for controlling the passage of air through the separting deck.

We wish it to be understood that when working on certain characters of materials, it may be advisable to extend the air-blowing baffle 55 along both sides of the dividing wall 47, and also along and around the sides of the angle-wall 46, and that such location of the blowing baffle is within the scope of our improvement.

In the diagrammatic views 12, 13 and 14, we show diagrammatically the condition or stratification of the material being treated at the dotted lines A—A, B—B and C—C. In these figures we have indicated the heaviest and the lightest particles only which are the two extremes, and lying between these zones would come the particles of intermediate weight, which will themselves, form into zones in proportion to their specific gravity, and the number of these intermediate zones depends upon the character of the material being treated. Fig. 13 diagrammatically shows the stratification of the material on the line B—B of Fig. 3, which is the flat part of the table, and at this point the heavier particles are centered more at the middle of the table, and the strata of the relatively lighter particles thereabove, the lightest particles overflowing the tailing riffle 38 at the opposite sides of the table as shown at $d$. Fig. 14 shows diagrammatically the stratification on the line C—C, through the raised or ridged part of the table. The heaviest particles are still more concentrated at the center of the table, and the relatively lighter strata thereabove, the overflowing of the lightest particles of the mass at this point occurring at $d$—$d$. Fig. 14$^a$ shows diagrammatically the stratification of the material on the line D—D, in which the strata of the heavier and lighter material are illustrated.

In our new table the restricted part of the table at the junction of the arms of the Y is narrower than the width of the mass, being fed to the opposite end of the stem of the Y, that is to say, the feed pan is wider than the narrowest part of the table.

In carrying out our process on the apparatus here illustrated, the material to be treated is fed to the pan 36 by any suitable mechanical feeding mechanism, and it is delivered to the butt end of the Y of the table in a wide stream. Immediately upon falling on the table it is subjected to the air-pressure through the pervious deck of the table and to the reciprocation of the table and to the deflecting riffles. As a result the mass is in an approximate fluid state so that the lightest particles almost immediately float to the top of the mass, while the relatively heavier materials arrange themselves in strata according to their differences in specific gravity, the heaviest on the floor and the relatively lighter in strata thereabove, substantially as illustrated in Fig. 12. This quick stratification is materially assisted by the shape of the floor at the receiving point of the table, and by the relatively converging riffles above the pervious floor, and one stratification gradually merges into the other, according to their differences in specific gravity. The pervious deck has its receiving end somewhat lower than its delivery end, as clearly shown in Fig. 2, whereby the material treated is fed uphill, so to speak. As the material being treated passes along the table from the line A—A, its stratification and separation is becoming more decided and more perfect, the concentration of the heavier particles to the center of the table being more decided by the shape of the floor of the deck and the converging riffles, while the lighter particles above the riffles are not subjected to the action of the riffles and the depressed floor of the table, and as a consequence, the lightest particles of the mass begin to flow over the tailing riffle 38, substantially at its rear end as illustrated in Fig. 13, while the relatively heavier particles of the mass continue to be concentrated at the center of the table, and when they reach the level portion of the table, indicated at B—B, Fig. 3, the separation has become more decided, the lighter particles of the mass at this point flowing over the tailing riffle 38, and are directed between the cutting fingers 70 and 71, thus being directed to their final destination. As the material being treated advances along the stem of the Y of the table, it reaches that part of the table which is elevated or ridged at its center on the dotted line C—C at which point the separation of the elements of the mass have become still more decided with the heavier particles still more concentrated in the center, and the relatively lighter particles in strata thereabove, the lightest particles of the mass at this point overflowing the tailing riffle 38 between the guiding fingers 71 and the adjacent side of the arm of the Y. We wish to point out that the particles of the mass which overflow the tailing riffle 38 before reaching the guiding finger 70 are the lightest particles of the mass and they are suitably separately collected, while the lighter particles of the mass which overflow between the guiding fingers 70 and 71 are heavier than those which overflow before reaching the bar 70, and these are separately collected, and the relatively lighter particles which overflow the tailing riffle 38 beyond the guiding finger 71 are heavier than the particles which have overflowed the tailing riffle before reaching the finger 71, and these latter are separately collected. We desire it to be understood that the specific gravities of the lighter particles of the mass which overflow the tailing riffle 38, gradually increase in their weight from the rear end of the tailing riffle 38 to its forward end, and that any desired number of separations of these overflowing lighter particles may be accomplished by providing a suitable number of dividing guiding fingers to provide the desired number of passageways. The arrangement of the guiding fingers here shown is only illustrative, and not intended to in any way limit the number of divisions that may be made of the lighter particles that may overflow the tailing riffle throughout its length.

The mass remaining on the table is considerably reduced in volume, by reason of the fact that the lightest particles are overflowing the tailing riffles located at opposite sides of the table and the mass remaining on the table is being gradually concentrated by reason of the gradual narrowing of the table, and all the time there is a stream of the heaviest materials passing over the unobstructed part of the table, where they may have comparative freedom of action in the line of imparted movement caused by the thrust of the table, and in the form of table here shown, this stream is at the center. When the mass remaining on the table has been finally restricted by reaching the narrow part of the table, it is divided into two divergent streams by means of the vertically and longitudinally arranged dividing wall 47. This divides the flowing mass into two substantially equal divergent streams which are directed into the two arms of the Y of the table. The distribution of these divided masses across the receiving ends of the arms of the Y is facilitated by reason of the fact that some of the riffles of the main part or stem of the Y of the table, extend cross the receiving end of the arms, as shown at 40. Each of these divided masses is treated alike in their respective channels or arms of the Y, and a description of the operation of one of the arms will suffice as a description for both.

The divided remaining mass is separated in these arms or channels by the combined reciprocating movement, gravity and the air-cushion. The air-cushion floats the lighter particles to the top of the mass in the arm or channel, whereby the heavier particles settle on the floor and are moved forward between the riffles by the differential movement of the table and are concentrated against the concentrating bar 42 and pile or roll up and form a concentrated bank which exerts a back pressure on the lighter materials causing them to flow laterally at an angle to the channel or arm and are floated and overflow the tailing riffle 41, it being understood that the lightest particles overflow at the inner end of the tailing riffle 41, and their weight gradually increases to the outer end of the tailing riffle. Sometimes the heavier particles which are concentrated against the concentrating member 42, consist of different products, some of which are of sufficient value to recover separately from the others. For this purpose the concentrating member 42 is composed of a plurality of pivoted sections which can be turned to form an opening, or openings at any point or points in the concentrating member to let the particles pass therethrough which it is desired to separately collect. These products after passing through the opening or openings of the concentrating member fall upon the skirt-board and are directed to any desired point by guiding fingers 72 and 73, which are capable of adjustment for that purpose. Some of those particles of the mass in the arm or channel which do not overflow the tailing riffle 41, pass down to the side 52 of the arm and overflow it, while the heavier which have not been liberated through the concentrated member 42, bank against the concentrating riffle 53, and some of them overflow the riffle, while those that remain fall out at the point of the arm. This concentrating riffle 53 is decreased in height from its inner to its outer end as above described, and if desired can be vertically adjustable. The object of this concentrating riffle is to permit a sufficient overflow of the relatively heavier particles to maintain a given width of flow of the heavier particles passing out of the end 52. The particles passing off the end of the arm or channel 39 are composed of lighter or heavier particles at the beginning of the zone of the final separation, which lies between the inner end of the guiding fingers 74, which we term the middlings, while they relatively heavier products pass out at the point of the arm, which is the finished separation.

The function of the pathway D on the arms of the Y is to present an unobstructed surface to the heavier elements which are banked against the concentrating member thus assuring freedom of action on the floor of the table so that the heavier elements will more easily move adjacent the concentrating member and at an angle to the riffles. In practice this portion of the deck or pathway, is made smooth, or slick, by omitting the "over cover" of wire cloth, the object being to reduce the friction of the heavier particles on the floor of the table to the minimum while those particles are banked against the concentrating member.

The central unobstructed portion of the stem of the Y will be unobstructed to the extent that no riffles will lie in or across that portion of the deck through the pathway at the center for the heavier elements, but is preferably provided with a suitable roughening means to assure a rapid propulsion of those particles in line with the thrust of the table, this "roughening means" being simply the wire cloth "over cover" which is omitted from the pathway for the heavier elements on the arms of the Y.

The term "unobstructed surface" used in the specification and in the appended claims when applied to the central channel of the stem of the Y deck, in its broad sense, means sufficiently less obstructed than the riffle portion of the stem of the Y to permit more freedom of action of the heavier particles within the channel and in line with the thrust of the table.

A peculiarity of the operation of our new table, is that it first produces a partially cleaned concentrated stream by eliminating a portion of the feed as a cleaned product, thereby producing a sufficient amount of the partially cleaned concentrated product to enable an efficient separation by a banking operation of the material remaining on the deck after elimination of the cleaned portion of the feed.

We have already called attention to the fact that the separating deck is inclined upward slightly from its feed end to its delivery end. It is the differential movement of the table which causes the particles of the mass to move upgrade, so to speak, towards the delivery end. The specific directions of movement of the particles have been already set forth. The inclination of the separating deck will vary according to the character of the material operated upon, and the highest end of the table is vertically adjustable for this purpose.

We have also stated that the air controlling strips are so shaped as to control the air-pressure through the pervious floor of the separating deck. In Fig. 16, we have indicated by arrows this variation in pressure, the arrows pointing in the direction of the diminishing air pressure.

We do not limit ourselves to the exact constructions hereinbefore described, as these constructions may be varied without departing from the spirit and scope of our invention as expressed in the appended claims.

We do not limit ourselves to the Y-shaped table for the reason that the arms of the Y can be omitted by anyone desiring to omit them and their added advantages and efficient operation.

Having thus described our invention, what we claim and desire to secure by Letters Patent is:

1. The process of concentrating and separating a mass of material, the particles of which have different characteristics, which consists in reciprocating the mass on an air-cushioned table, concentrating the heavier particles into a concentrated stream moving in the line of reciprocation on an unobstructed surface at the top of said table, simultaneously effecting a lateral separation and delivery of a portion of the lighter particles, then simultaneously subjecting the particles of the concentrated stream and the remaining mass of relatively lighter particles to combined air-cushioning and reciprocating actions.

2. The process of concentrating and separating a mass of material, the particles of which have different characteristics which consists in reciprocating the mass on an air-cushioned table, concentrating the heavier particles into a concentrated stream moving in the line of reciprocation on an unobstructed surface at the top of said table, simultaneously effecting a lateral separation and delivery of a portion of the lighter particles by the gradual narrowing of the mass, then simultaneously subjecting the particles of the concentrated stream and the remaining mass of relatively lighter particles to combined air-cushioning and reciprocating actions.

3. The process of concentrating and separating a mass of material, the particles of which have different characteristics which consists in reciprocating the mass on an air-cushioned table, concentrating the heavier particles into an unbroken concentrating stream, moving in the line of reciprocation on an unobstructed surface at the top of said table, simultaneously effecting a lateral separation and delivering of the lighter particles, then separating the particles of the concentrated stream and the remaining mass by causing a banking zone of the heavier particles to separate from the lighter ones, and separately delivering the separated particles.

4. The process of concentrating and separating a mass of material, the particles of which have different characteristics, which consists in reciprocating the mass on an air-cushioned table, concentrating the heavier particles into an unbroken concentrated stream in the line of reciprocation on an unobstructed surface at the top of said table, by first subjecting the heavier particles to a gravity convergent action towards the unobstructed surface, simultaneously effecting a lateral separation and delivery of a portion of the lighter particles, then simultaneously subjecting the particles of the concentrated stream and the remaining mass of relatively lighter particles to combined air cushioning and reciprocating actions.

5. The process of concentrating and separating a mass of material, the particles of which have different characteristics which consists in reciprocating the mass on an air-cushioned table, concentrating the heavier particles into an unbroken concentrating stream moving in the line of reciprocation on an unobstructed surface at the top of said table, by first subjecting the said mass to combined positive gravity and positive convergent actions, then relieving the mass of the positive gravity action, and simultaneously effecting a lateral separation and delivery of a portion of the lighter particles, then simultaneously subjecting the particles of the concentrated stream and the remaining mass of relatively lighter particles to combined air-cushioning and reciprocating actions.

6. The process of concentrating and separating a mass of material, the particles of which have different characteristics, which consists in reciprocating the mass on an air-cushioned table, concentrating the heavier particles into an unbroken concentrated stream moving in the line of reciprocation on an unobstructed surface at the top of said table by first subjecting the mass to a combined positive gravity and positive converging actions, then relieving the mass of the positive gravity action, then again subjecting the mass to a positive gravity action and positive convergent action, then simultaneously subjecting the particles of the concentrated stream and the remaining mass of lighter particles to combined air-cushioning and reciprocating actions.

7. The process of concentrating and separating a mass of material, the particles of which have different characteristics, which consists in reciprocating the mass on an air-cushioned table, concentrating the heavier particles into an unbroken concentrated stream moving in the line of reciprocation on an unobstructed surface at the top of said table by first subjecting the mass to a positive centralizing gravity action, then relieving the mass of the positive centralizing gravity action, then subjecting the mass to a positive separating gravity action, simultaneously effecting a lateral separation and delivery of a portion of the lighter particles, and then simultaneously subjecting the particles of the concentrating stream and the remaining mass of relatively lighter particles to combined air-cushioning and reciprocating actions.

8. The process of concentrating and separating a mass of material, the particles of which have different characteristics which consists in reciprocating the mass on an air-cushioned table, concentrating the heavier particles into an unbroken concentrated stream moving in the line of reciprocation on said table, by first subjecting the mass to a positive gravity centralizing action, then relieving the mass of said gravity centralizing action, simultaneously effecting a lateral separation and delivery of a portion of the lighter particles of the mass while relieved of the positive gravity action by concentrating the mass, then simultaneously subjecting the particles of the concentrated stream and the remaining mass of relatively lighter particles to combined air-cushioning and reciprocating actions.

9. The process of concentrating and reciprocating a mass of material, the particles of which have different characteristics, which consist in reciprocating the mass on an air-cushioned table, concentrating the heavier particles into an unbroken concentrated stream moving in the line of reciprocation on an unobstructed surface at the top of said table, simultaneously effecting a lateral separation and the delivery of a portion of the lighter particles, then dividing the concentrated stream and remaining mass of lighter particles into two divergent streams, and then finally separating the particles of the streams.

10. The process of concentrating and separating a mass of material, the particles of which have different characteristics, which consists in reciprocating the mass on an air-cushioned table, concentrating the heavier particles into a concentrated stream moving in the line of reciprocation, dividing the stream into two divergent streams, reconcentrating the mass of these streams after the separation of the lighter elements, and then finally separating the particles.

11. The process of concentrating and separating a mass of material, the particles of which have different characteristics, which consists in reciprocating the mass on an air-cushioned table, concentrating the heavier particles into a central concentrated stream moving in the line of reciprocation on an unobstructed surface at the top of said table, dividing the stream into two divergent streams and then separating the particles of the masses of the divergent streams.

12. The process of concentrating and separating a mass of material, the particles of which have different characteristics, which consists in reciprocating the mass on an air-cushioned table, concentrating the heavier particles into a concentrated stream moving in the line of reciprocation, dividing the stream into two divergent streams, and then separating the masses in the divergent streams by forming a banking zone of heavier particles and laterally discharging the lighter particles.

13. The process of concentrating and separating a mass of material, the particles of which have different characteristics, which consists in reciprocating the mass on an air-cushioned table and causing stratification thereof, and effecting final separation by first forming a banking zone of heavier particles, and finally subjecting the heavier particles of the mass to a reconcentration of the mass by forming a gradual vertical diminishing zone of the heavier particles after the lighter particles have been removed.

14. The process of concentrating and separating a mass of material, the particles of which have different characteristics, which consists in reciprocating the mass on an air-cushioned table to effect stratification of the particles, subjecting the heavier particles to a banking zone and laterally discharging the lighter particles over said zone, and finally subjecting the remaining heavy particles to a gradually vertically diminishing zone composed of its own constituents.

15. The process of concentrating and separating a mass of material, the particles of which have different characteristics, which consists in reciprocating the mass on an air-cushioned table to effect stratification of the particles, and effecting separation of the particles by forming a zone of the heavy particles and subjecting the surface of the particles composing the zone to a backward current of air substantially adjacent the banking zone.

16. The process of concentrating and separating a mass of material, the particles of which have different characteristics, which consists in reciprocating the mass on an air-cushioned table to effect stratification of the particles, and effecting a separation of the particles by forming the heavier particles into a banking zone and subjecting the surface of the particles substantially adjacent to the banking zone to a downward and backward current of air.

17. The process of concentrating and separating a mass of material, the particles of which have different characteristics, which consists in reciprocating the mass on an air-cushioned table to effect stratification of the particles, effecting a separation of the particles by forming a banking zone of the heavier particles, simultaneously subjecting the surface of the particles substantially adjacent to the banking zone to an outward current of air and finally delivering the remaining heavy particles by a gradually vertically diminishing banking zone.

18. An apparatus for dry separation of the character described comprising a table having a Y-shaped air cushioned separating deck.

19. An apparatus for dry separation of the character described, comprising a table having a Y-shaped air cushioned separating deck, the feed end of the table being at the butt of the stem of the Y.

20. An apparatus for dry separation of the character described, comprising a table having a Y-shaped air cushioned separating deck, the feeding end of the deck being at the butt of the stem of the Y and the final separation at the extremities of the arms of the Y.

21. An apparatus of the character described, comprising a table having a Y-shaped separating deck, the feeding end of the deck being at the butt of the stem of the Y, the table diminishing in width towards the arms of the Y.

22. An apparatus of the character described, comprising a table having a Y-shaped separating deck, the feed end of the deck located at the butt of the stem of the Y, the table gradually diminishing in width and having its narrowest point substantially at the junction of the stem of the Y with the arms thereof.

23. An apparatus of the character described, comprising a table having a Y-shaped separating deck with the feed end of the deck located at the butt of the stem of the Y, the stem of the Y having an unobstructed longitudinally central portion, and diagonally arranged riffles at opposite sides of the unobstructed portion.

24. An apparatus of the type described, comprising a table having a Y-shaped separating deck with its feeding end located at the butt of the stem of the Y, the stem of the Y having a longitudinally arranged unobstructed central portion and forwardly and inwardly extending riffles at opposite sides of the unobstructed portion, the riffles gradually diminishing from their rear to their front ends.

25. An apparatus of the type described, comprising a table having a Y-shaped separating deck, the stem of the deck having a longitudinally centrally arranged unobstructed portion, and forwardly and inwardly extending riffles at opposite sides of the central portion, the riffles gradually diminishing in height from their rear to their front ends and the plurality of riffles diminishing in height in a direction transverse the stem of the Y.

26. An apparatus for dry separation of the type described, comprising a table having a Y-shaped air cushioned separating deck with its feeding end at the butt of the stem of the Y, and a rearwardly extending dividing wall located at the junction of the stem and the arms of the Y.

27. An apparatus of the type described, comprising a table, having a Y-shaped separating deck with the feed located at the butt of the stem of the Y, the stem having a longitudinally centrally arranged unobstructed portion and inwardly and forwardly extending riffles, and the arms of the Y having riffles extending longitudinally of the table and thereby at an angle to the riffles of the stem of the Y.

28. An apparatus of the type described, comprising a table having a Y-shaped separating deck with the feed located at the butt end of the stem of the Y, the stem having a longitudinally and centrally arranged unobstructed portion, the stem having inwardly and forwardly extending riffles at opposite sides of the unobstructed portion, some of the riffles extending into the lower ends of the arms of the Y, and the arms of the Y having the riffles extending longitudinally of the table and therefore at an angle to the riffles of the stem.

29. An apparatus of the type described, comprising a Y-shaped table having a separating deck with its feed located at the butt of the stem of the deck, a rearwardly and vertically extending dividing wall located at the junction of the stem and the arms of the Y, the inner sides of the arms of the Y having a concentrating member for banking the heavy particles of the mass.

30. An apparatus of the type described, comprising a table having a Y-shaped separating deck with its feed located at the butt of the stem of the deck, a rearwardly and vertically arranged division wall at the junction of the stem and the arms, the inner edges of the arms of the Y having a concentrating member for banking the heavy particles of the mass and means for directing a backward current of air on top of the mass at a point back of the concentrating member.

31. An apparatus of the type described, comprising a table having a Y-shaped separating deck with its feed at the butt end of the stem of the Y, a rearwardly and vertically arranged dividing wall at the junction of the stem and arms of the Y, the inner sides of the arms of the Y having longitudinally extending concentrating members for banking the heavy particles of the mass and banking riffles extending beyond the concentrating members, the riffles diminishing in height from their inner to their outer ends.

32. An apparatus of the type described, comprising a table, having a Y-shaped separating deck with its feed end at the stem of the Y, the stem of the Y narrowing towards the arms of the Y, and the outer sides of the narrow portion of the stem having tailing riffles over which the lighter particles of the mass are caused to flow.

33. An apparatus of the type described, comprising a table having a Y-shaped separating deck, the stem of the Y diminishing in width towards the arms of the Y, the stem having forwardly and inwardly projecting riffles and the sides of the narrowed portion of the stem having tailing riffles substantially higher than the first said riffles for the purpose described.

34. An apparatus of the type described, comprising a table having a separating deck having a main portion provided with a longitudinally extending unobstructed floor and forwardly and inwardly extending riffles and having a separating arm extending at an angle to the main portion, the separating arm having longitudinally extending riffles which are therefore at an angle to the riffles of the main portion of the table.

35. An apparatus of the type described, comprising a table having a deck with a main separating portion, and a separating separately acting arm extending at an angle from one end of the main portion, the opposite end of the main portion being the feed end of the deck.

36. An apparatus of the type described, comprising a table having a separating deck with a main portion having a separating arm extending outward at an angle to one end of the main portion of the deck, the opposite end of the deck being its feed end, the separating arm having longitudinally extending riffles and the main portion of the table inwardly and forwardly extending riffles.

37. An apparatus of the type described, comprising a table having a deck with a main portion and having a separating arm extending outward at an angle to one end of the main portion, the opposite end of the main portion being the feed end, and the inner side of the separating arm having a concentrating member for forming a concentrated zone of the heavier particles of the mass.

38. A dry separating apparatus, comprising a separating deck having a main portion with pervious bottom and riffles, and an arm extending at an angle to the outer end of said main portion of said arm formed into a point extending at an angle to said main portion.

39. An apparatus of the type described, comprising a separating deck having a main portion with a feed at one end and having an outwardly extending arm, the outer end of the arm formed to substantially a point.

40. An apparatus of the type described, comprising a table having a Y-shaped deck with a feed at the butt end of the Y and the extremities of the arms of the Y shaped to substantial points.

41. An apparatus of the type described, comprising a table having a separating deck with a pervious bottom and means for forcing air therethrough, the deck having its bottom at the feed end depressed in the center and its walls inclined upwardly and outwardly.

42. An apparatus of the type described, comprising a table having a separating deck with its feed end depressed in the center, its intermediate portion substantially straight transversely and merging into an elevated central portion.

43. An apparatus of the type described, comprising a table having a deck having a pervious bottom, the feed end of the deck depressed and gradually merging into an intermediate straight portion transverse the table which in turn gradually merges into a central elevated portion, for the purpose described.

44. An apparatus of the type described, comprising a table having a separating deck having a pervious bottom, the deck having an intermediate straight portion transverse the deck, the feed end located at one side of the straight portion and depressed, and a central elevated portion located at the opposite side of the straight portion from the feed end.

45. An apparatus of the type described comprising a table having a Y-shaped deck with its feed end at the butt of the Y, the feed end of the stem of the Y being depressed, the intermediate portion of the stem of the Y being substantially straight transversely and merging into a central elevated portion.

46. An apparatus of the type described, comprising a table having a Y-shaped deck with its feed end at the butt of the stem of the Y, the feed end of the deck depressed and the deck centrally and longitudinally elevated at the junction of the arms with the stem, and the stem of the Y substantially straight transversely between the elevated and depressed portions.

47. An apparatus of the type described, comprising a Y-shaped air-cushioned table having the feed at the butt end of the stem of the Y and having a central elevated portion located at the junction of the arms of the Y, thus providing outwardly declining sides at the feed end of the arms of the Y.

48. The process of refining a mixture carrying deleterious elements which consists in first feeding the mixture to an air cushioned oscillated surface, forming a central stream of less purity than the feed by eliminating a portion of the feed as a refined product and then further refining the remaining impure stream by forming a banking zone to deliver separated products.

49. The process of separating the particles of a mixture differing in weight which consists in reciprocating the mass on an air cushioned table, increasing the proportion of the heavy element to the lighter element to secure a mixture of the proper proportion of heavier and lighter elements for separation by banking and eliminating a portion of the lighter element and then separating the mixture thus produced by banking.

50. An improved reciprocating pervious air-cushioned deck for dry separation of materials, comprising a pervious member of small mesh through which air passes but through which the materials cannot pass, and a wire netting placed above the said pervious member and having a relatively large mesh for causing friction on the heavier particles to move them forward by the movement of the deck, and riffles on the last mentioned member.

51. A reciprocating pervious air-cushioned deck for dry separation of materials, comprising an under wire netting, a pervious member supported thereabove with small mesh through which air passes, but through which the materials do not pass, and a coarser wire netting above the pervious member for causing friction on the heavier particles of the materials for moving them by the movement of the deck, and riffles upon the top of the last mentioned wire netting.

52. A mechanism for separating intermixed divided materials of different specific gravities including in combination a bed sloping upwardly in the direction of movement of the material, a plurality of parallelly arranged separating partitions located substantially in the plane of the top of the deck, and converging from the rear toward the front of the bed, means for blowing air upwardly through the bed, and means for reciprocating the bed longitudinally thereof.

53. A mechanism for separating intermixed divided materials of different specific gravities including in combination a plurality of separating projections located substantially in the plane of the top of the deck and converging from the rear toward the front of the bed, means for reciprocating the bed longitudinally thereof, and means for forcing air under pressure through said bed and in different amounts in different parts of the bed.

54. A mechanism for separating intermixed divided materials of different specific gravities including in combination a plurality of separating partitions located substantially in the plane of the top of the deck and converging from the rear toward the front of the bed, means for reciprocating the bed longitudinally thereof with a quick forward movement, and means for forcing air under pressure through said bed and in different amounts in different parts of the bed.

55. A mechanism for separating intermixed divided materials of different specific gravities including in combination a plurality of parallelly arranged separating partitions located substantially in the plane of the top of the deck, and converging from the rear toward the front of the bed, means for reciprocating the bed longitudinally thereof, and means for forcing air under pressure through said bed.

56. A mechanism for separating intermixed divided materials of different specific gravities including in combination a plurality of parallelly arranged separating partitions, located substantially in the plane of the top of the deck, and converging from the rear toward the front of the bed, means for reciprocating the bed longitudinally thereof with a quick forward movement, and means for forcing air under pressure through said bed.

57. A mechanism for separating intermixed divided materials of different specific gravities including in combination a plurality of parallelly arranged separating partitions located substantially in the plane of the top of the deck, and converging from the rear toward the front of the bed, means for reciprocating the bed longitudinally thereof with a quick forward movement, and means for forcing air under pressure through said bed and in different amounts in different parts of the bed.

58. A mechanism for separating intermixed divided materials of different specific gravities including in combination a bed sloping upwardly toward the front of the bed, a plurality of separating partitions converging from the rear toward the front of the bed but leaving a free pathway along the bed, and means for reciprocating the bed longitudinally thereof.

59. A separating table comprising a pervious deck provided with a plurality of closely arranged separating partitions extending inward from opposite sides of the table to constitute a substantially continuous central wholly unobstructed portion for concentrating the heavier particles of the material, and means for forcing air under pressure through the said deck, thereby causing separation of the particles composing the material.

60. An apparatus comprising a separating table having a pervious deck, a plurality of closely arranged forwardly extending riffles substantially stopping short of the center of the deck thereby forming an unobstructed central portion for concentrating the heavier particles of the material, means for reciprocating the said deck, and means for forcing air through the said deck thereby causing a separation of the particles composing the material.

61. A mechanism for separating intermixed divided materials of different specific gravities including in combination a pervious bed, means supplying air under the said bed and flowing upward through the bed to lift the lighter materials and thereby separate them, means for reciprocating the bed longitudinally thereof and a plurality of separating partitions extending at an angle forward from the rear toward the front of the bed and at an angle to the direction of reciprocation but leaving a free unobstructed pathway along the bed substantially thruout its length for the flow of the heavier materials.

In testimony whereof we hereunto affix our signatures.

HENRY MOORE SUTTON.
WALTER LIVINGSTON STEELE.
EDWIN GOODWIN STEELE.